Figure 1:
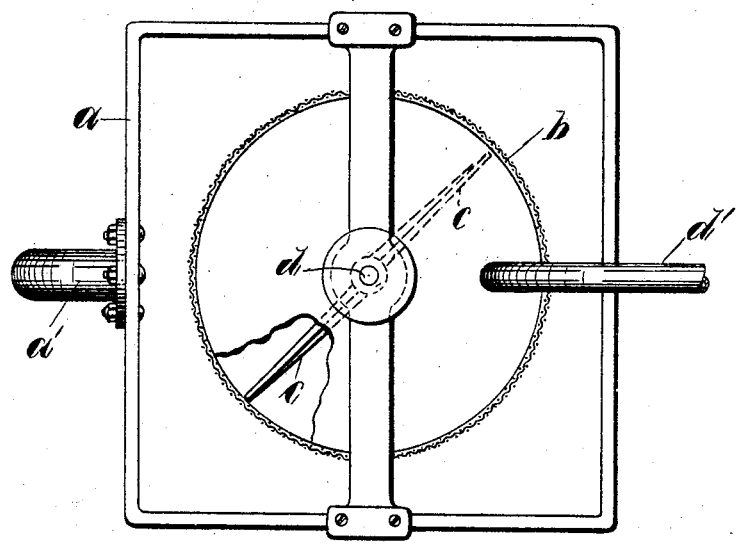

No. 771,557. PATENTED OCT. 4, 1904.
F. M. LOCKE.
APPARATUS FOR SCREENING LIQUID CLAY.
APPLICATION FILED MAY 4, 1903.
NO MODEL.

Witnesses:
W. T. Brewer.
M. M. Nott.

Inventor
Fred M. Locke
By
Howard P. Denison
Attorney

No. 771,557.                                                    Patented October 4, 1904.

UNITED STATES PATENT OFFICE.

FRED M. LOCKE, OF VICTOR, NEW YORK.

APPARATUS FOR SCREENING LIQUID CLAY.

SPECIFICATION forming part of Letters Patent No. 771,557, dated October 4, 1904.

Application filed May 4, 1903. Serial No. 155,583. (No model.)

*To all whom it may concern:*

Be it known that I, FRED M. LOCKE, of Victor, in the county of Ontario, in the State of New York, have invented new and useful Improvements in Apparatus for Screening Liquid Clay, of which the following, taken in connection with the accompanying drawings, is a full, clear, and exact description.

This invention relates to apparatus for screening liquid clay or similar material or separating from it the foreign or other materials which do not liquefy in water.

In the manufacture of porcelain the kaolin or clay is first ground, so as to reduce the size of the particles and enable them to readily dissolve or mix in water.

In connection with kaolin, however, there is always present more or less sand, silica, grit, and other foreign substances which do not dissolve in water and if allowed to pass into and form a part of the porcelain body will, when fired, produce a bubble or flaw in the porcelain and render it useless, and particularly so when used for insulators.

My object, therefore, is to produce means to separate the liquid kaolin or clay from the other foreign substances, such as sand and the like.

My further object is to produce means by which I am enabled to force or hurl by intermittent impacts the liquid mass of clay against the meshes of a fine screen, thus forcing the pure liquid kaolin or clay while in solution through the screen and allowing the sand and foreign material which is not dissolved to fall back, thereby causing a rapid and complete separation of the pure liquid kaolin or clay from the foreign matter.

I do not limit myself to the particular means shown for causing this pulsating impact of the liquid mass against the meshes of the screen, as it will be evident that it may be produced in various ways; but I do cover, broadly, the means of purifying liquid kaolin, clay, or similar materials from other substances by hurling it or throwing it through the meshes of a screen in intermittent impacts.

In the drawings I show means for accomplishing this result.

Figure 2:
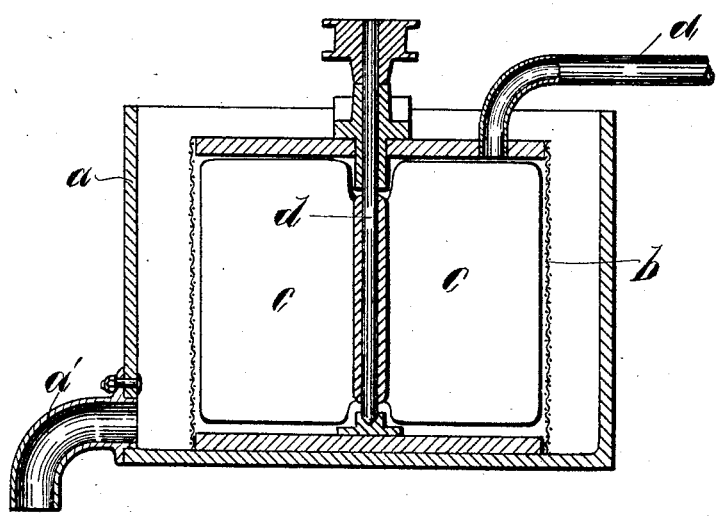

The machine illustrated is constructed as follows:

Figure 1 is a top plan view of the device, the cover being practically broken away, showing one of the wings therein. Fig. 2 is a vertical section on line *x x*, Fig. 1.

*a* is a receptacle of any form or size desired, constructed preferably tight, so that the liquid will not pass through the joints, having an opening or draw-off pipe *a'* at the bottom upon one side.

Within the receptacle *a* I place a foraminous cylinder or screen-drum *b* of any size or form desired, except that the walls of the screen-drum should be substantially vertical, so that the particles which do not pass through the mesh will drop by gravity down out of the way.

Within the drum I mount pulsating arms *c*, usually upon a shaft *d*, and provide means for rotating this shaft and the wings mounted thereon.

*d'* is an inlet-pipe through which the liquid kaolin or clay is admitted into the drum, and as the wings *c* are rotated they engage the liquid and hurl it by its centrifugal force against the meshes of the drum, allowing only the fine particles to pass through, and the coarser particles are allowed to drop down to the bottom within the drum by their own weight.

The object of the intermittent hurling of the liquid kaolin or clay against the gauze is for the purpose of allowing the sand and foreign materials to drop down rather than being forced through the meshes.

The screen-cylinder *b* is fixed from rotation in an upright position, so as to leave a sufficient space between it and the sides of the receptacle *a* to permit the free exit of the purified liquid clay through the meshes of the screen.

The blades *c* revolve on a vertical axis in close proximity to the bottom, top, and sides of the cylinder *b*, so that the liquid clay entering the top at one side of the axis is caught in its descent by the blades and hurled laterally with sufficient force against the foraminous sides to cause the pure-clay solution to pass through the fine meshes and out through the opening $d$, while the coarser foreign matter not in solution impinges the inside of the screen and falls to the bottom and may be removed from time to time in any desired manner not necessary to herein illustrate or describe.

Having thus described my invention, what I claim, and desire to secure by Letters Patent, is—

1. An apparatus for separating foreign matter from a liquid clay or kaolin solution, comprising an outer receptacle having an outlet, a stationary cylinder centrally arranged in said outer receptacle and having a solid top and bottom and foraminous walls, an inlet-pipe discharging into the cylinder through the top thereof to one side of the center of the cylinder, and rotary blades of flat rectangular form disposed vertically in the cylinder and extending from a point adjacent the top to a point in close proximity to the bottom, the outer edge of said blades being in close proximity throughout their length to the sides of the cylinder, and the said blades extending across the cylinder within and without the inlet-pipe, as and for the purpose described.

2. An apparatus for separating foreign matter from a liquid solution, comprising an outer receptacle having an outlet, an inner receptacle having foraminous walls, an inlet-pipe discharging into the inner receptacle to one side of the center of the same, and flat rotary blades disposed vertically in the center and adapted when revolved to extend across and pass successively under the inlet.

In witness whereof I have hereunto set my hand this 30th day of April, 1903.

FRED M. LOCKE.

Witnesses:
C. J. PEER,
B. ELLIS.